United States Patent
Ishii et al.

(10) Patent No.: US 9,360,213 B2
(45) Date of Patent: Jun. 7, 2016

(54) VALVE LEAK DETECTING METHOD AND COMBUSTION EQUIPMENT

(71) Applicant: Azbil Corporation, Tokyo (JP)

(72) Inventors: Shigeki Ishii, Tokyo (JP); Satoru Yamagishi, Tokyo (JP); Yuuichi Kumazawa, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 267 days.

(21) Appl. No.: 14/134,198

(22) Filed: Dec. 19, 2013

(65) Prior Publication Data
US 2014/0170570 A1 Jun. 19, 2014

(30) Foreign Application Priority Data

Dec. 19, 2012 (JP) .................................. 2012-277017

(51) Int. Cl.
*F23N 5/24* (2006.01)
*G01M 3/04* (2006.01)
*F23K 5/00* (2006.01)
*F23K 5/16* (2006.01)

(52) U.S. Cl.
CPC ................ *F23N 5/242* (2013.01); *F23K 5/007* (2013.01); *F23K 5/16* (2013.01); *F23N 5/24* (2013.01); *G01M 3/04* (2013.01)

(58) Field of Classification Search
CPC ....... F23K 5/007; F23K 5/16; F23K 2401/20; F23K 2900/05001; F23N 5/242; F23N 5/24; F23N 2025/04; G01M 3/04
See application file for complete search history.

(56) References Cited

U.S. PATENT DOCUMENTS 5,542,397 A * 8/1996 Takahata ............ F02M 25/0809
                                              123/520

FOREIGN PATENT DOCUMENTS

JP        2003-130347 A    5/2003

OTHER PUBLICATIONS

European Search Report dated Aug. 27, 2014, which issued during prosecution of European Application No. 13198517.8, which corresponds to the present application.

* cited by examiner

*Primary Examiner* — Alfred Basichas
(74) *Attorney, Agent, or Firm* — Troutman Sanders LLP (57) ABSTRACT

A valve leak detecting method includes a started pressure setting step for opening and closing valves individually to set a pressure in a pipe, a first threshold value evaluating step for closing the valves, after the pressure being set to no less than the threshold value, and evaluating whether the pressure, after a specific time interval has elapsed, is at least threshold value, a second valve normalcy evaluating step for evaluating that one of the valves is operating properly or faultily if the pressure is at least or less than the threshold value, respectively, a second threshold value evaluating step for closing the valves and evaluating whether the pressure is less than the threshold value after a specific time interval has elapsed, and a first valve normalcy evaluating step for evaluating whether the valve is operating properly depending on the pressure being less or no less than the threshold value.

8 Claims, 10 Drawing Sheets

VALVE LEAK DETECTING METHOD AND COMBUSTION EQUIPMENT

CROSS REFERENCE TO RELATED APPLICATION

This application claims priority under 35 U.S.C. §119 to Japanese Patent Application No. 2012-277017, filed on Dec. 19, 2012, the entire content of which being hereby incorporated herein by reference.

FIELD OF TECHNOLOGY

The present invention relates to a valve leak detecting method for detecting a leak in a valve that is used in a fuel supplying system for combustion equipment, and to combustion equipment that uses said method.

BACKGROUND

Conventionally in combustion equipment used in boilers, or the like, fuel supplying systems that supply fuel, such as natural gas, to a burner have included two valves in series to ensure that there is no fuel leakage when the combustion equipment is stopped. Additionally, leak detection has been performed in both valves, at the time of the pre-purge of the combustion equipment, to check whether or not these valves leak. See, for example, Japanese Unexamined Patent Application Publication 2003-130347 ("the JP '347").

However, in the conventional valve leak detection disclosed in the JP '347, the leak detection is performed for both valves with at the time of the pre-purge of the combustion equipment, and thus there is a problem in that this causes the pre-purge to be time-consuming. Moreover, in conventional valve leak detection, there is a problem in that fuel flows into the combustion chamber when a valve leak actually occurs.

The present invention was created in order to solve problems such as described above, and an aspect thereof is to provide a valve leak detecting method and combustion equipment that suppresses the pre-purge loss, that prevents fuel from flowing into the combustion chamber even when a leak occurs in a valve, and enables a valve leak to be detected easily.

SUMMARY

The present invention provides a valve leak detecting method through combustion equipment including a first valve that is connected to a pipe of a fuel supplying system and controls a fluid flow rate within the pipe, a second valve that is connected in series to the pipe on the downstream side of the first valve and controls a fluid flow rate within the pipe, a third valve that is connected in series to the pipe on the downstream side of the second valve and controls a fluid flow rate within the pipe, a pressure detecting portion that detects pressure within the pipe between the first and second valves, and a leak detecting portion that performs leak detection for the first and second valves, based on a pressure within the pipe, detected by the pressure detecting portion, by controlling the first through third valves individually. The leak detecting portion performs a pressure setting step for setting the pressure within the pipe between the first and second valves to no less than a specific threshold value or to less than a specific threshold value by opening and closing the first through third valves individually when the combustion equipment stops combustion or after combustion is stopped, a started pressure setting step for setting the pressure within the pipe between the two valves to no less than the specific threshold value by opening and closing the first valve, in a state wherein the second and third valves are closed, when the combustion equipment is started, a first threshold value evaluating step for evaluating whether or not the pressure within the pipe, detected by the pressure detecting portion after a first time interval has elapsed in a state wherein the first through third valves are closed, is at least the specific threshold value, after the pressure within the pipe has been set to at least the specific threshold value in the pressure setting step or the started pressure setting step, a second valve normalcy evaluating step for evaluating the second valve as operating properly if the evaluation in the first threshold value evaluating step was that the pressure within the pipe is at least the specific threshold value, and for evaluating that the second valve is faulty if the evaluation was that the pressure within the pipe is less than the specific threshold value, a second threshold value evaluating step for evaluating whether or not the pressure within the pipe, detected by the pressure detecting portion after a second time interval has elapsed in a state wherein the first valve and the third valve are closed, is less than the specific threshold value, after the pressure within the pipe has been set to less than the specific threshold value in the pressure setting step, and a first valve normalcy evaluating step for evaluating the first valve as operating properly if the evaluation in the second threshold value evaluating step was that the pressure within the pipe is less than the specific threshold value, and for evaluating that the first valve is faulty if the evaluation was that the pressure within the pipe is no less than the specific threshold value.

Combustion equipment according to the present invention includes a first valve that is connected to a pipe of a fuel supplying system and controls a fluid flow rate within the pipe, a second valve that is connected in series to the pipe on the downstream side of the first valve and controls a fluid flow rate within the pipe, a third valve that is connected in series to the pipe on the downstream side of the second valve and controls a fluid flow rate within the pipe, a pressure detecting portion that detects pressure within the pipe between the first and second valves, and a leak detecting portion that performs leak detection for the first and second valves, based on a pressure within the pipe, detected by the pressure detecting portion, by controlling the first through third valves individually. The leak detecting portion has a pressure setting portion that sets the pressure within the pipe between the first and second valves to no less than a specific threshold value or to less than a specific threshold value by opening and closing the first through third valves individually when the combustion equipment stops combustion or after combustion is stopped, a started pressure setting portion that sets the pressure within the pipe between the two valves to no less than the specific threshold value by opening and closing the first valve, in a state wherein the second and third valves are closed, when the combustion equipment is started, a first threshold value evaluating portion that evaluates whether or not the pressure within the pipe, detected by the pressure detecting portion after a first time interval has elapsed with the first through third valves in a closed state, is at least the specific threshold value, after the pressure within the pipe has been set to at least the specific threshold value by the pressure setting portion or the started pressure setting portion, a second valve normalcy evaluating portion that evaluates the second valve as operating properly if the evaluation by the first threshold value evaluating portion was that the pressure within the pipe is at least the specific threshold value, and evaluates that the second valve is faulty if the evaluation was that the pressure within the pipe is less than the specific threshold value, a second threshold value evaluating portion that evaluates whether or not the pressure within the pipe, detected by the pressure detecting portion after a second time interval has elapsed in a state wherein the first valve and the third valve are closed, is less than the specific threshold value, after the pressure within the pipe has been set to less than the specific threshold value by the pressure setting portion, and a first valve normalcy evaluating portion that evaluates the first valve as operating properly if the evaluation by the second threshold value evaluating portion was that the pressure within the pipe is less than the specific threshold value, and evaluates that the first valve is faulty if the evaluation was that the pressure within the pipe is no less than the specific threshold value.

The present invention enables the suppression of pre-purge loss, the prevention of fuel from flowing into the combustion chamber even when a leak occurs in a valve, and the easy detection of a valve leak.

DETAILED DESCRIPTION

An example according to the present invention will be explained in detail below referencing the figures.

Figure 1:
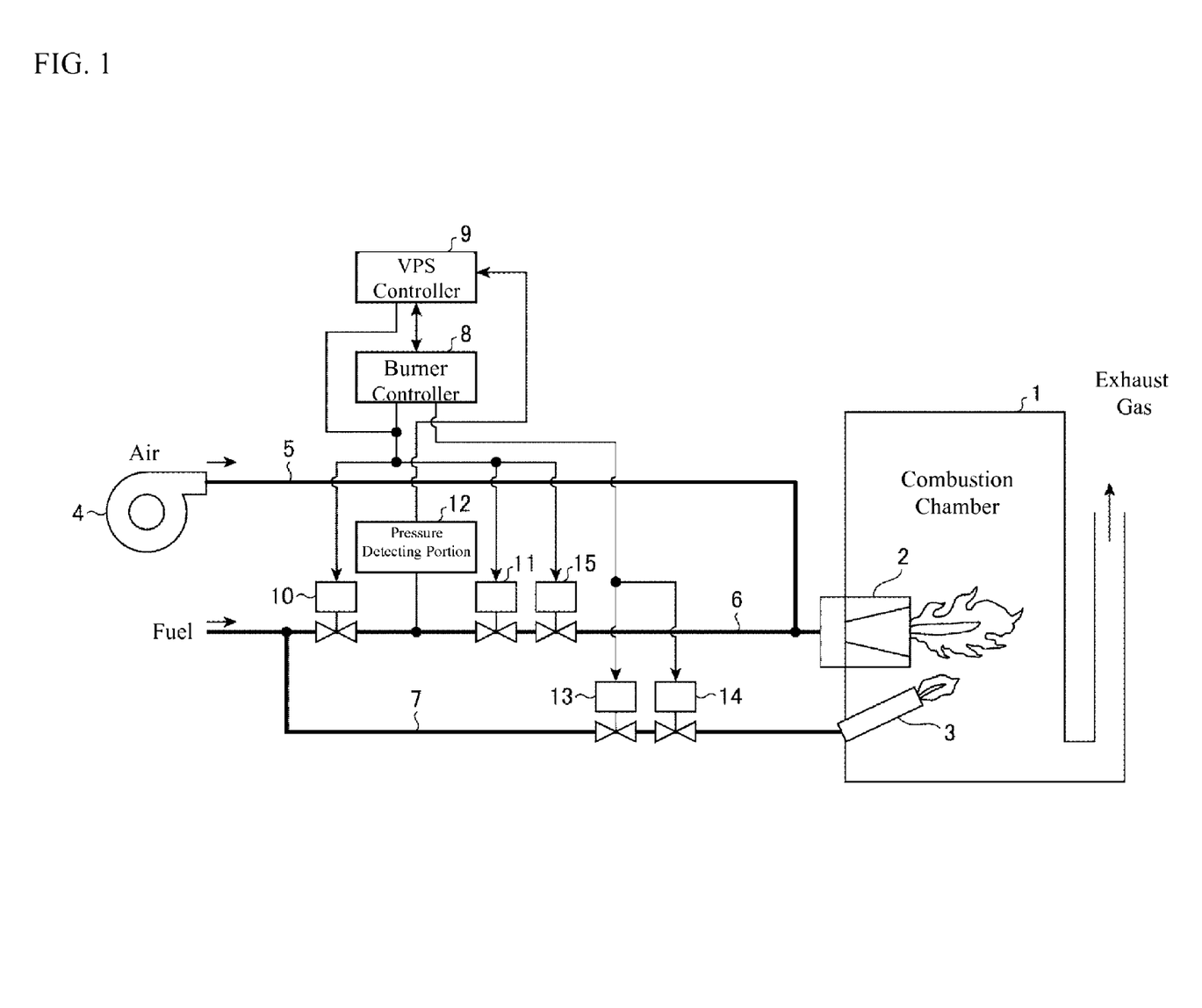
FIG. 1 is a diagram illustrating the overall structure of combustion equipment to which a valve leak detecting method according to an example according to the present invention is applied.

FIG. 1 is a diagram illustrating the overall structure of combustion equipment to which a valve leak detecting method according to the example according to the present invention is applied.

As illustrated in FIG. 1, the combustion equipment includes a main burner 2 and a pilot burner 3 that are built into a combustion chamber 1, an air supplying system 5 that supplies air to the main burner 2 through a blower 4; first and second fuel supplying systems 6 and 7 that supply fuel, such as natural gas, to the main burner 2 and the pilot burner 3, a burner controller (also termed a "valve controlling portion") 8 that controls valves 10, 11, 13, 14, and 15 described below, provided in the first and second fuel supplying systems 6 and 7; and a VPS (Valve Proving System) controller (leak detecting portion) 9 that performs leak detection for the valves 10 and 11.

Moreover, valves 10 and 11, which prevent leakage of the fluid within the supply pipe to the main burner 2 side when combustion in the combustion equipment is stopped, along with controlling the fluid flow rate within a single pipe, are connected in series in the first fuel supplying system 6 that supplies fuel to the main burner 2. Note that the valve (the first valve) 10 is disposed on the upstream side of the pipe, and the valve (the second valve) 11 is disposed on the downstream side. Moreover, a pressure detecting portion 12 that detects the pressure within the pipe between the valves 10 and 11, is provided between the valves 10 and 11.

Similarly, valves 13 and 14, which prevent leakage of the fluid within the supply pipe to the pilot burner 3 side when combustion in the combustion equipment is stopped, along with controlling the fluid flow rate within a single pipe, are connected in series in the second fuel supplying system 7 that supplies fuel to the pilot burner 3. Note that the valve 13 is disposed on the upstream side of the pipe, and the valve 14 is disposed on the downstream side.

Furthermore, in the first fuel supplying system 6, a valve (a third valve) 15, which controls the fluid flow rate within the pipe, is connected in series and connected on the downstream side of the valve 11 of the pipe.

Of course, in the fuel supplying systems 6 and 7, the upstream side is put under a higher pressure, so the fuel flows to the downstream side.

The structure of the VPS controller 9 will be explained next in reference to FIG. 2.

Figure 2:
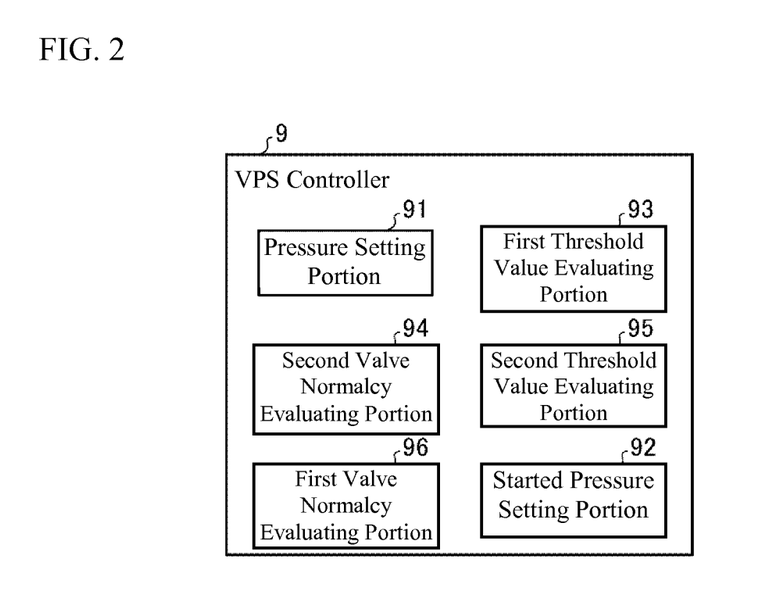
FIG. 2 is a diagram illustrating the structure of a VPS controller in the example according to the present invention.

The VPS controller 9, as illustrated in FIG. 2, is structured from a pressure setting portion 91, a started pressure setting portion 92, a first threshold value evaluating portion 93, a second valve normalcy evaluating portion 94, a second threshold value evaluating portion 95, and a first valve normalcy evaluating portion 96.

The pressure setting portion 91, by opening and closing the valves 10, 11, and 15 individually when stopping the combustion of the combustion equipment or after the combustion has been stopped, causes the pressure within the pipe between the valves 10 and 11 to be no less than a specific threshold value or less than a specific threshold value.

The started pressure setting portion 92 opens and closes the valve 10, in a state wherein the valves 11 and 15 are closed while the combustion equipment is started, to cause the pressure within the pipe between valves 10 and 11 to be no less than a specific threshold value.

The first threshold value evaluating portion 93, after the pressure within the pipe has been caused to be no less than a specific threshold value by the pressure setting portion 91 or the started pressure setting portion 92 then, with the valves 10, 11, and 15 in the closed state, evaluates whether or not the pressure within the pipe, detected by the pressure detecting portion 12 after a specific time interval has elapsed, is at least the specific threshold value.

If the evaluation, by the first threshold value evaluating portion 93, was that the pressure within the pipe is at least the specific threshold value, the second valve normalcy evaluating portion 94 evaluates that the valve 11 is operating properly, but if the evaluation was that the pressure within the pipe is less than the specific threshold value, the evaluation is that the valve 11 is faulty.

The second threshold value evaluating portion 95, after the pressure within the pipe has been caused to be less than a specific threshold value by the pressure setting portion 91 then, with the valve 10 and the valve 11 and/or the valve 15 in the closed state, evaluates whether or not the pressure within the pipe, detected by the pressure detecting portion 12 after a specific time interval has elapsed, is less than specific threshold value.

If the evaluation, by the second threshold value evaluating portion 95, was that the pressure within the pipe is less than the specific threshold value, the first valve normalcy evaluating portion 96 evaluates that the valve 10 is operating properly, but if the evaluation was that the pressure within the pipe is not less than the specific threshold value, the evaluation is that the valve 10 is faulty.

The method by which the VPS controller 9 of the combustion equipment, structured as described above, detects leaks in the valves 10 and 11 will be explained next.

The case wherein the leak detection for the valves 10 and 11 is performed when the combustion equipment is started will be shown first.

Figure 3:
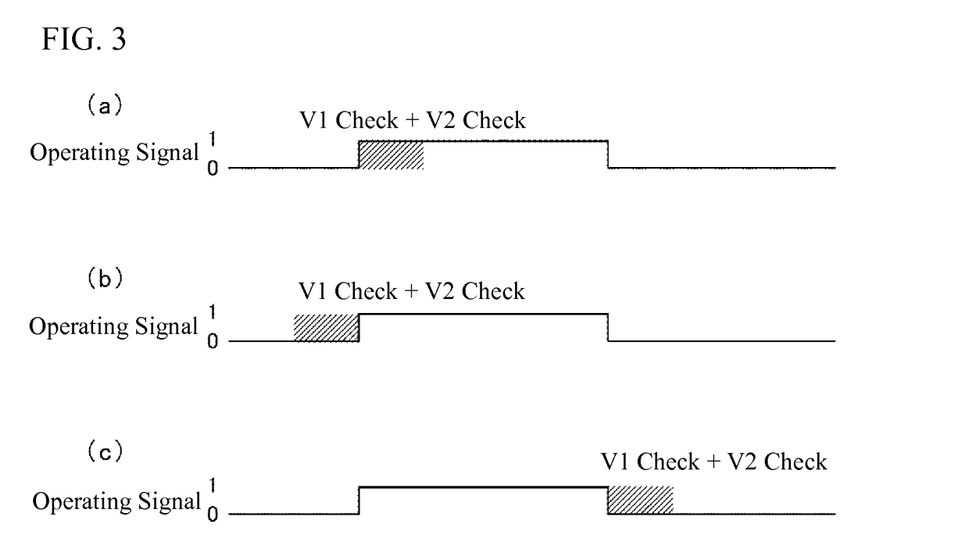
FIG. 3 is a timing chart showing the relationship between the valve leak detection and the startup of the combustion equipment and the termination of combustion, in the example according to the present invention.
Figure 4:
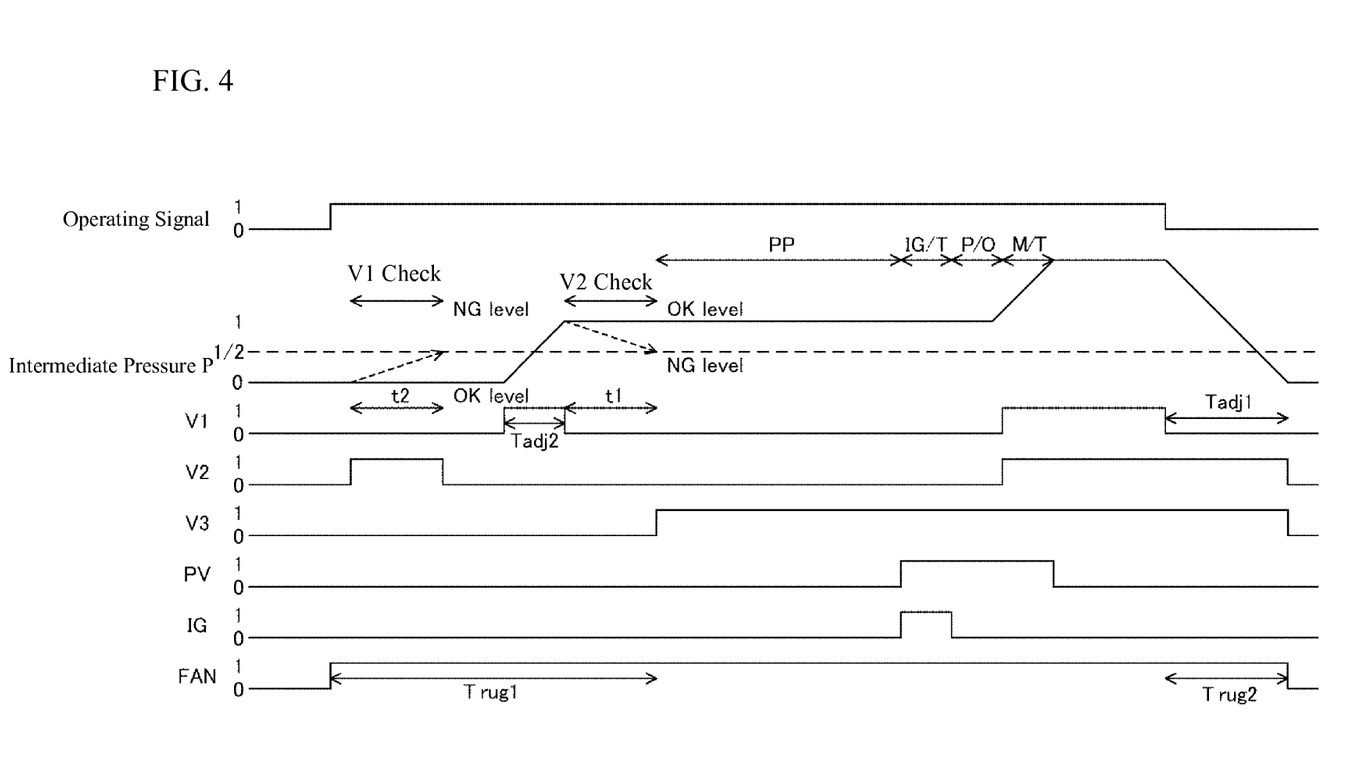
FIG. 4 is a timing chart showing the overall operation of the combustion equipment (for the case wherein leak detection is performed while started) according to the example according to the present invention.
Figure 5:
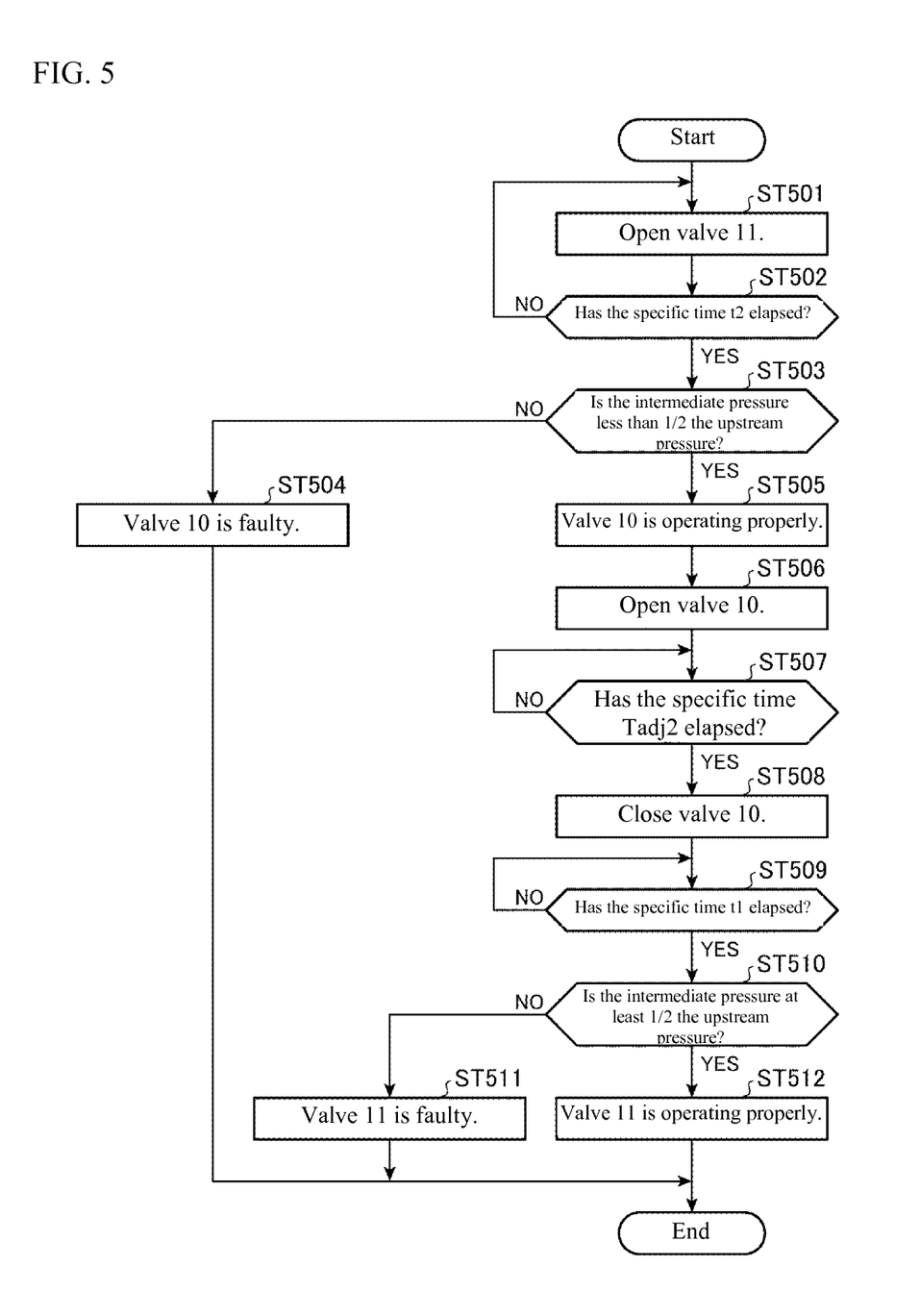
FIG. 5 is a diagram showing the valve leak detecting operation (while started) by the combustion equipment according to the example according to the present invention.

FIG. 3 is a timing chart showing the relationship between the valve 10 and 11 leak detection and the startup of the combustion equipment and the termination of combustion, in the example according to the present invention, where, in the figure, the part with the slanted lines indicates the time intervals for detecting leaks in the valves 10 and 11. Note that "started" refers to the combusting state (including preparation for performing combustion), and "combustion stopped" refers to the non-combusting state (including preparation for extinguishing the combustion). FIG. 4 is a timing chart showing the overall operation of the combustion equipment, and FIG. 5 is a flowchart showing the valve 10 and 11 leak detection operation by the combustion equipment.

In the leak detection for the valves 10 and 11 when the combustion equipment is started in the example, when the combustion equipment is started or stops combustion the valves 10, 11 and 15 are opened and closed individually to set a specific value for the pressure within the pipe between the valves 10 and 11 (hereinafter termed the "intermediate pressure"). After this, as illustrated in FIG. 3(a), with the valve 15 in the closed state, the variation in the intermediate pressure is monitored by the pressure detecting portion 12 to check alternatingly for faults in the valves 10 and 11 (V1 check and V2 check).

Note that the pressure within the pipe on the upstream side of the valve 10 (the side of the fuel supply source, not shown) is termed the "upstream pressure." In the combustion equipment, over the interval wherein the operating signal is 1, and over the interval wherein the operating signal is 0 and the valves 11 and 15 are open (Trug2), the blower 4 operates to provide air through the air supplying system 5 to the main burner 2 (purge mode).

In the leak detection by the VPS controller 9 for the valves 10 and 11, when the combustion equipment is started (the state wherein the operating signal shown in FIG. 4 is 1), leak detection is performed first on the valve 10 (V1 check in FIG. 4). Note that FIG. 4 shows a case wherein the intermediate pressure is less than ½ of the upstream pressure (minimum value (=0)).

As illustrated in FIG. 5, in this leak detection for the valve 10, the second threshold value evaluating portion 95 opens the valve 11 and evaluates whether or not a specific time interval t2 has elapsed (Steps ST501 and 502). Here t2 is the time interval required for the intermediate pressure to go from the minimum value to being at least ½ of the upstream pressure when a leak has occurred in the valve 10. In this Step ST502, if the evaluation is that t2 has not elapsed, then the sequence returns to Step ST502 again, and enters a standby mode.

On the other hand, if, in Step ST502, the second threshold value evaluating portion 95 evaluates that t2 has elapsed, then the pressure detecting portion 12 is used to evaluate whether or not the intermediate pressure is less than ½ of the upstream pressure (Step ST503). Note that Steps ST502 and 503 correspond to the second threshold value evaluating step in the present invention.

In this step ST503, if the second threshold value evaluating portion 95 evaluates the intermediate pressure to be no less than ½ of the upstream pressure (the NG level in FIG. 4), then the first valve normalcy evaluating portion 96 evaluates that there is a fault wherein a leak has occurred in the valve 10, performs a lockout procedure, and outputs an alarm (Step ST504).

On the other hand if, in Step ST503, the second threshold value evaluating portion 95 evaluates that the intermediate pressure is less than the upstream pressure (the OK level in FIG. 4), then the first valve normalcy evaluating portion 96 evaluates that the valve 10 is operating properly, with no leak (Step ST505). Thereafter, processing shifts to leak detection for the valve 11 (V2 check in FIG. 4).

In this leak detection for the valve 11, the started pressure setting portion 92 opens the valve 10 and evaluates whether or not a specific time interval Tadj2 has elapsed (Steps ST506 and 507). Here Tadj2 is the time interval required for the intermediate pressure to go from the minimum value to the maximum value. In this Step ST507, if the evaluation is that Tadj2 has not elapsed, then the sequence returns to Step ST507 again, and enters a standby mode.

On the other hand, if, in Step ST507, the started pressure setting portion 92 evaluates that Tadj2 has elapsed, it closes the valve 10 (Step ST508). Note that Steps ST506 through 508 correspond to the started pressure setting step in the present invention.

The first threshold value evaluating portion 93 evaluates whether or not a specific time interval t1 has elapsed after the valve 10 was closed (Step ST509). Here t1 is the time interval required for the intermediate pressure to go from the maximum value to being less than ½ of the upstream pressure when a leak has occurred in the valve 11. In this Step ST509, if the evaluation is that t1 has not elapsed, then the sequence returns to Step ST509 again, and enters a standby mode.

On the other hand, if, in Step ST509, the first threshold value evaluating portion 93 evaluates that t1 has elapsed, then the pressure detecting portion 12 is used to evaluate whether or not the intermediate pressure is at least ½ of the upstream pressure (Step ST510). Note that Steps ST509 and 510 correspond to the first threshold value evaluating step in the present invention.

In this step ST510, if the first threshold value evaluating portion 93 evaluates the intermediate pressure to be less than ½ of the upstream pressure (the NG level in FIG. 4), then the second valve normalcy evaluating portion 94 evaluates that there is a fault wherein a leak has occurred in the valve 11, performs a lockout procedure, and outputs an alarm (Step ST511).

On the other hand if, in Step ST510, the first threshold value evaluating portion 93 evaluates that the intermediate pressure is at least the upstream pressure (the OK level in FIG. 4), then the second valve normalcy evaluating portion 94 evaluates that the valve 11 is operating properly, with no leak (Step ST512). Note that Steps ST511 and 512 correspond to the second valve normalcy evaluating step in the present invention.

Thereafter, the combustion equipment performs various processes (operating the blower 4 alone for a specific time interval to perform a pre-purge (PP) to exhaust any residual gas that is within the combustion chamber 1, an ignition trial (IG/T) for opening the valves 13 and 14 and lighting the pilot burner 3, a pilot only (P/O) for checking whether or not the pilot burner 3 is reliably ignited, prior to opening the valves 10, 11, and 15, and a main trial (M/T) for opening the valves 10, 11, and 15 to ignite the main burner 2, thus transitioning to the combustion operation. Note that if the valves 10 and 11 are operating properly, then the processing time Trug1 for detecting leaks in the valves 10 and 11 may be included in the pre-purge time.

Thereafter, when the combustion equipment stops combustion (when the operating signal shown in FIG. 4(a) goes from 1 to 0), the pressure setting portion 91 closes the valve 10, and then after a specific time interval Tadj1 elapses, closes the valves 11 and 15 (the pressure setting step). Here Tadj1 is the time interval required for the intermediate pressure to go from the maximum value to the minimum value (=0). In this way, the intermediate pressure is caused to go to the minimum value, enabling detection of a leak in the valve 10 in the next stage.

The case wherein the leak detection for the valves 10 and 11 is performed when the combustion equipment is stopped will be shown next.

Figure 6:
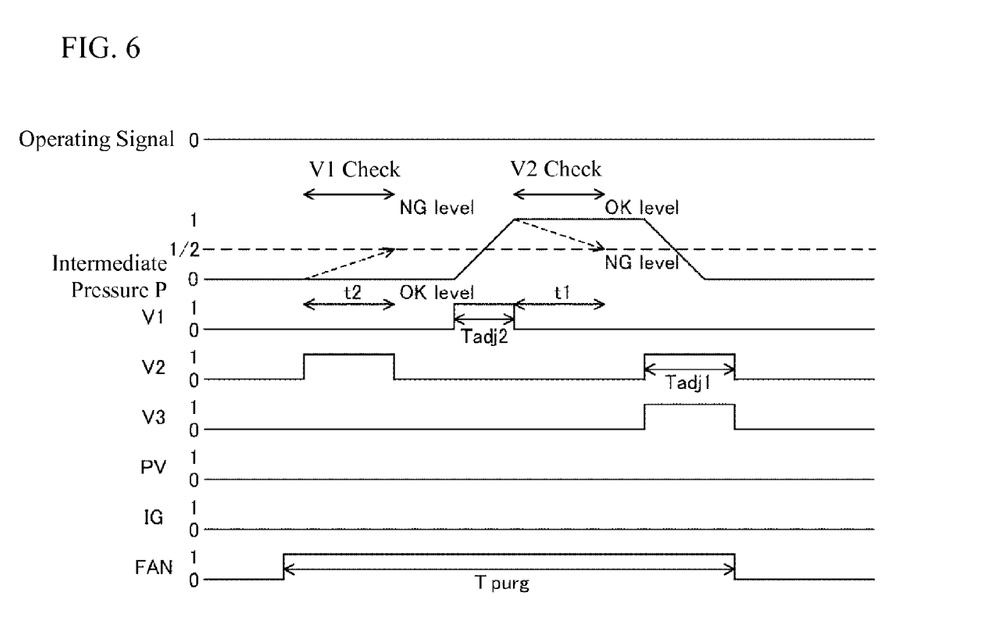
FIG. 6 is a timing chart showing the overall operation of the combustion equipment (for the case wherein leak detection is performed while stopped) according to the example according to the present invention.
Figure 7:
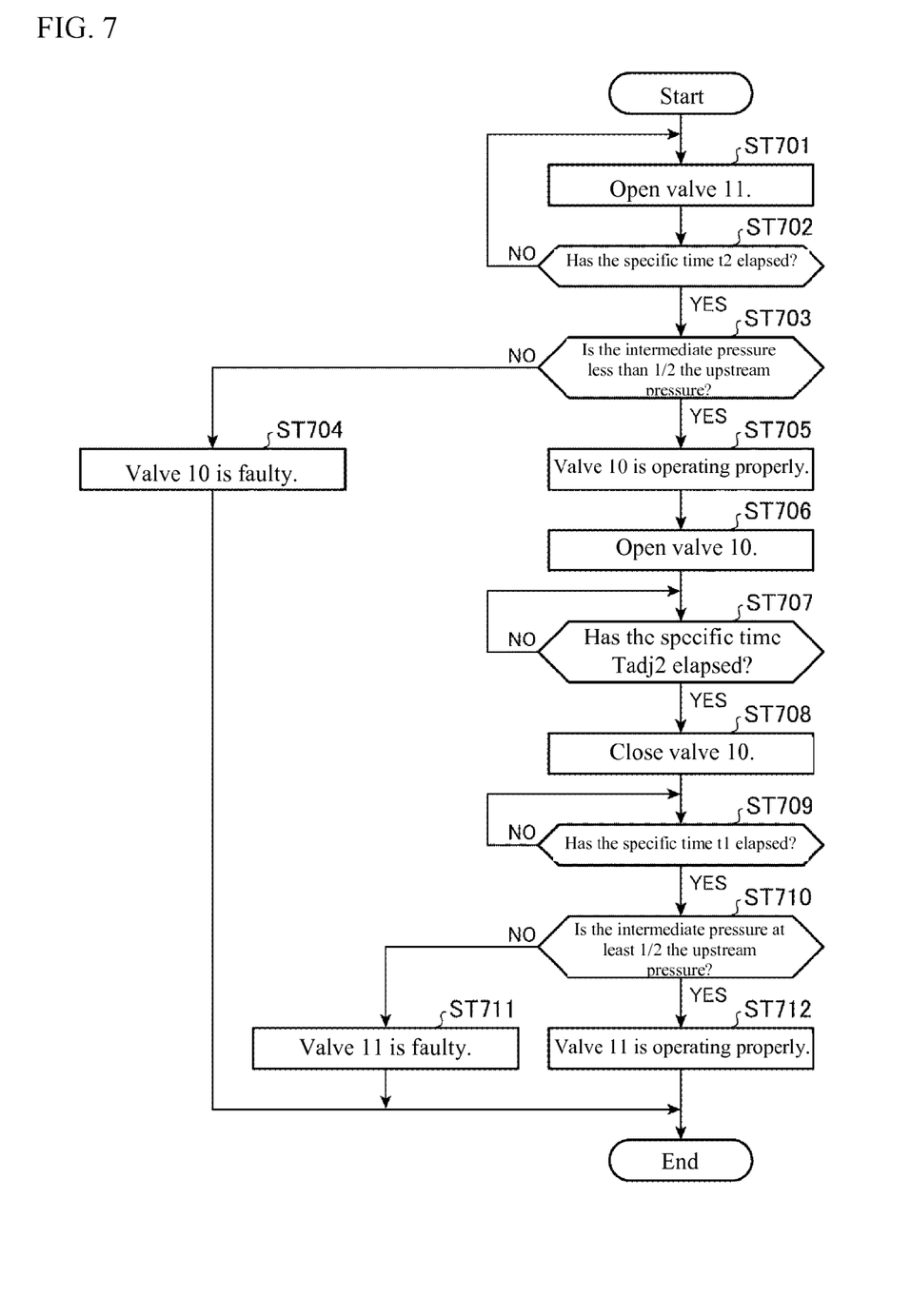
FIG. 7 is a diagram showing the valve leak detecting operation (while stopped) by the combustion equipment according to the example according to the present invention.

FIG. 6 is a timing chart showing the overall operation of the combustion equipment according to the example according to the present invention, and FIG. 7 is a flowchart showing the valve 10 and 11 leak detection operation by the combustion equipment.

In the leak detection for the valves 10 and 11 when the combustion equipment is stopped in the example, when the combustion equipment is stopped the valves 10, 11 and 15 are opened and closed individually to set a specific value for the intermediate pressure between the valves 10 and 11. After this, as illustrated in FIGS. 3(b) and (c), with the valves 11 and 15 in the closed state, the variation in the intermediate pressure is monitored by the pressure detecting portion 12 to check alternatingly for faults in the valves 10 and 11 (V1 check and V2 check).

Note that over the interval wherein the detection is being performed for the valves 10 and 11 (Tpurg), the blower 4 operates to provide air through the air supplying system 5 to the main burner 2 (purge mode).

In the leak detection by the VPS controller 9 for the valves 10 and 11, when the combustion equipment is stopped (the state wherein the operating signal shown in FIG. 6 is 0), leak detection is performed first on the valve 10 (V1 check in FIG. 6).

As illustrated in FIG. 7, in this leak detection for the valve 10, the second threshold value evaluating portion 95 opens the valve 11 and evaluates whether or not a specific time interval t2 has elapsed (Steps ST701 and 702). In this Step ST702, if the evaluation is that t2 has not elapsed, then the sequence returns to Step ST702 again, and enters a standby mode.

On the other hand, if, in Step ST702, the second threshold value evaluating portion 95 evaluates that t2 has elapsed, then the pressure detecting portion 12 is used to evaluate whether or not the intermediate pressure is less than ½ of the upstream pressure (Step ST703). Note that Steps ST702 and 703 correspond to the second threshold value evaluating step in the present invention.

In this step ST703, if the second threshold value evaluating portion 95 evaluates the intermediate pressure to be no less than ½ of the upstream pressure (the NG level in FIG. 6), then the first valve normalcy evaluating portion 96 evaluates that there is a fault wherein a leak has occurred in the valve 10, performs a lockout procedure, and outputs an alarm (Step ST704).

On the other hand if, in Step ST703, the second threshold value evaluating portion 95 evaluates that the intermediate pressure is less than the upstream pressure (the OK level in FIG. 6), then the first valve normalcy evaluating portion 96 evaluates that the valve 10 is operating properly, with no leak (Step ST705). Thereafter, processing shifts to leak detection for the valve 11 (V2 check in FIG. 6).

In this leak detection for the valve 11, the pressure setting portion 91 opens the valve 10 and evaluates whether or not a specific time interval Tadj2 has elapsed (Steps ST706 and 707). In this Step ST707, if the evaluation is that Tadj2 has not elapsed, then the sequence returns to Step ST707 again, and enters a standby mode.

On the other hand, if, in Step ST707, the pressure setting portion 91 evaluates that Tadj2 has elapsed, it closes the valve 10 (Step ST708). Note that Steps ST706 through 708 correspond to the pressure setting step in the present invention.

The first threshold value evaluating portion 93 evaluates whether or not a specific time interval t1 has elapsed (Step ST709). In this Step ST709, if the evaluation is that t1 has not elapsed, then the sequence returns to Step ST709 again, and enters a standby mode.

On the other hand, if, in Step ST709, the first threshold value evaluating portion 93 evaluates that t1 has elapsed, then the pressure detecting portion 12 is used to evaluate whether or not the intermediate pressure is at least ½ of the upstream pressure (Step ST710). Note that Steps ST709 and 710 correspond to the first threshold value evaluating step in the present invention.

In this step ST710, if the first threshold value evaluating portion 93 evaluates the intermediate pressure to be less than ½ of the upstream pressure (the NG level in FIG. 6), then the second valve normalcy evaluating portion 94 evaluates that there is a fault wherein a leak has occurred in the valve 11, performs a lockout procedure, and outputs an alarm (Step ST711).

On the other hand if, in Step ST710, the first threshold value evaluating portion 93 evaluates that the intermediate pressure is at least the upstream pressure (the OK level in FIG. 6), then the second valve normalcy evaluating portion 94 evaluates that the valve 11 is operating properly, with no leak (Step ST712). Note that Steps ST711 and 712 correspond to the second valve normalcy evaluating step in the present invention.

Thereafter, the pressure setting portion 91 first opens the valves 11 and 15 and, after a specific time interval Tadj1 has elapsed, closes the valves 11 and 15 (the pressure setting step). In this way, the intermediate pressure is caused to go to the minimum value, enabling detection of a leak in the valve 10 in the next stage.

As described above, in the example the structure is one wherein the valve 15 is provided on the downstream side of the valves 10 and 11, and the pressure detecting portion 12 is provided between the valves 10 and 11, and the valves, 11, and 15 are closed individually when the combustion equipment stops combustion, when the combustion is stopped, or when started, making it possible to prevent flow of fuel into the combustion chamber even when a leak occurs in a valve, enabling the leak detection for the valves 10 and 11 to be performed easily, and enabling suppression of the pre-purge loss. Moreover, because the leak detection for the valves 10 and 11 can be performed even when the combustion equipment is started, the present invention can be applied even to equipment that, once started, is not stopped for an extended period of time.

Note that the FIGS. 4 and 6 show the case wherein the intermediate pressure is set to the maximum value or the minimum value by the pressure setting portion 91, and the intermediate pressure is set to the maximum value by the started pressure setting portion 92. In contrast, the intermediate value may be set to near a threshold value (½ of the upstream pressure), to shorten the standby time intervals t1 and t2.

Figure 8:
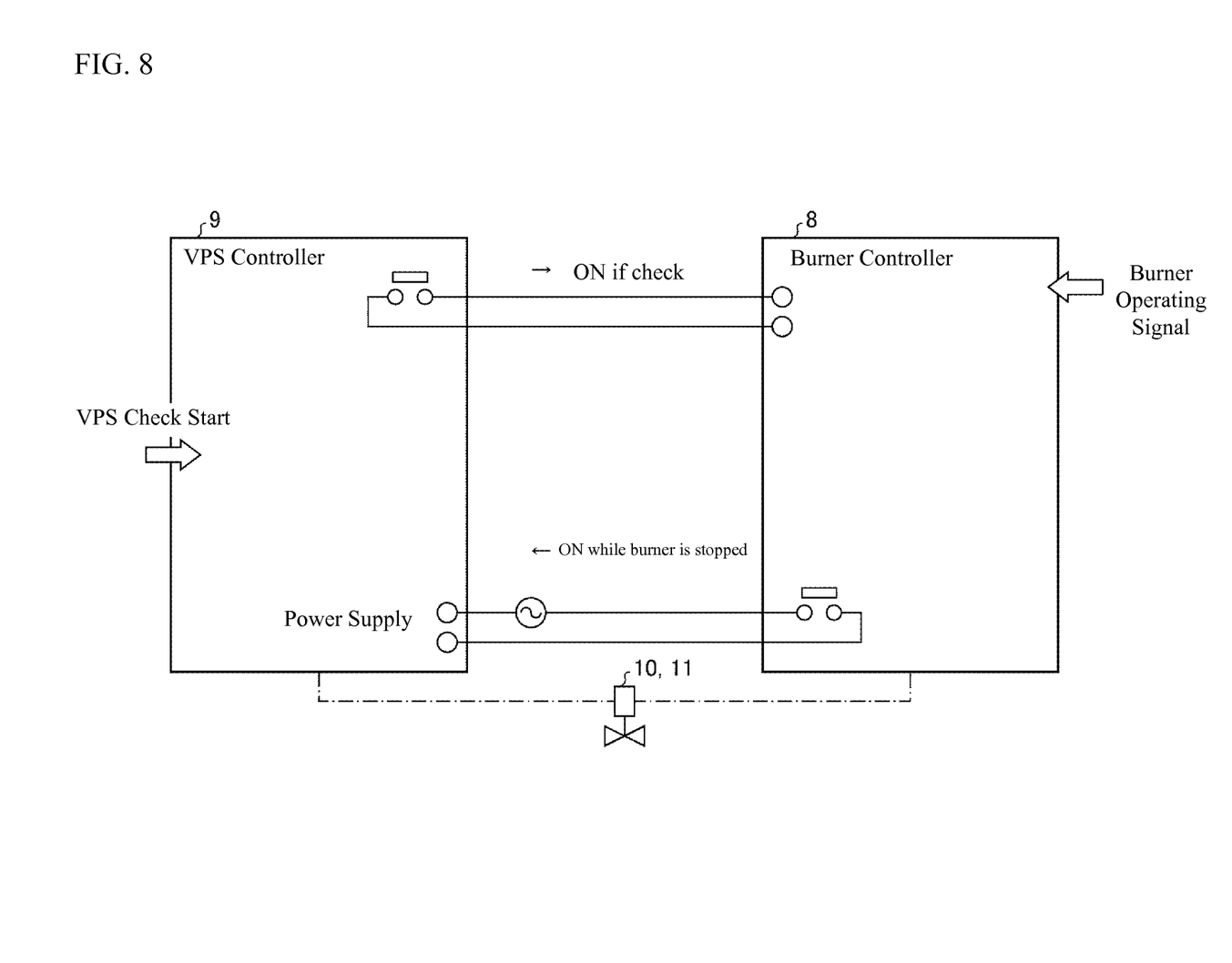
FIG. 8 is a diagram showing the linkage between the burner controller and the VPS controller in the combustion equipment according to the example according to the present invention.
Figure 9:
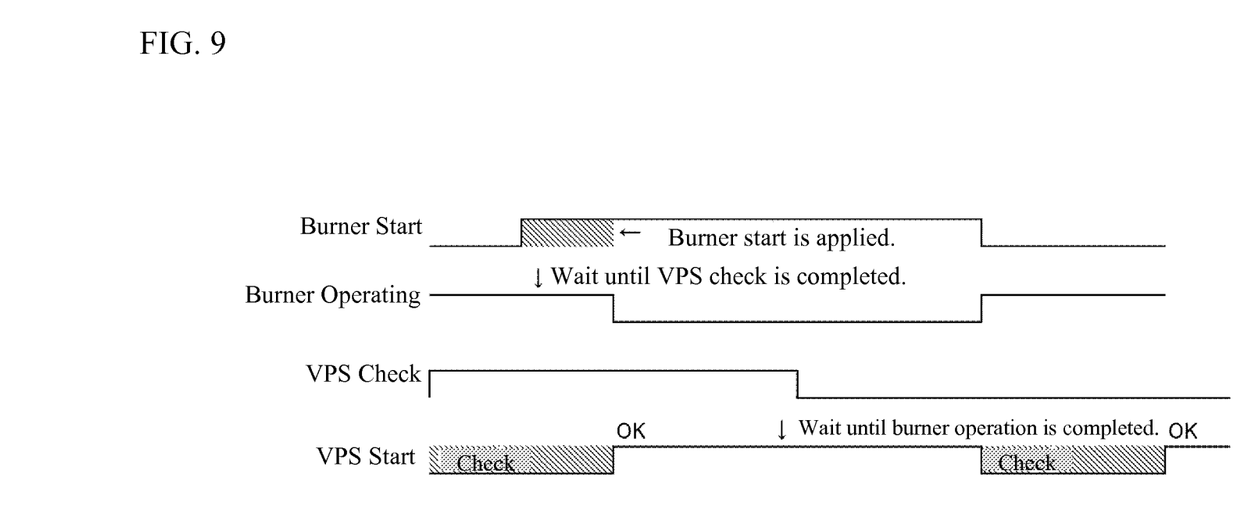
FIG. 9 is a timing chart showing the linked operation of the burner controller and the VPS controller in the combustion equipment according to the example according to the present invention.

Moreover, while, in the description above, the relationship between the burner controller 8 and the VPS controller 9 was not explained, the burner controller 8 and the VPS controller 9 control the same valves 10, 11, and 15, so if not linked skillfully there would be a risk that the valves 10, 11, and 15 could open unexpectedly, which would be dangerous. Given this, as illustrated in FIG. 8, for example, the contact point output from the VPS controller 9 side is provided to the burner controller 8, and, similarly, the contact point output from the burner controller 8 side is provided to the VPS controller 9. Given this, as illustrated in FIG. 9, if the VPS controller 9 is operating so that the input from the contact point output is OFF, then the burner controller 8 will be in a stopped mode (and does not report a fault), and when the burner controller 8 is operating, so that the input from the contact point output is OFF, the VPS controller 9 will be in a stopped state.

Figure 10:
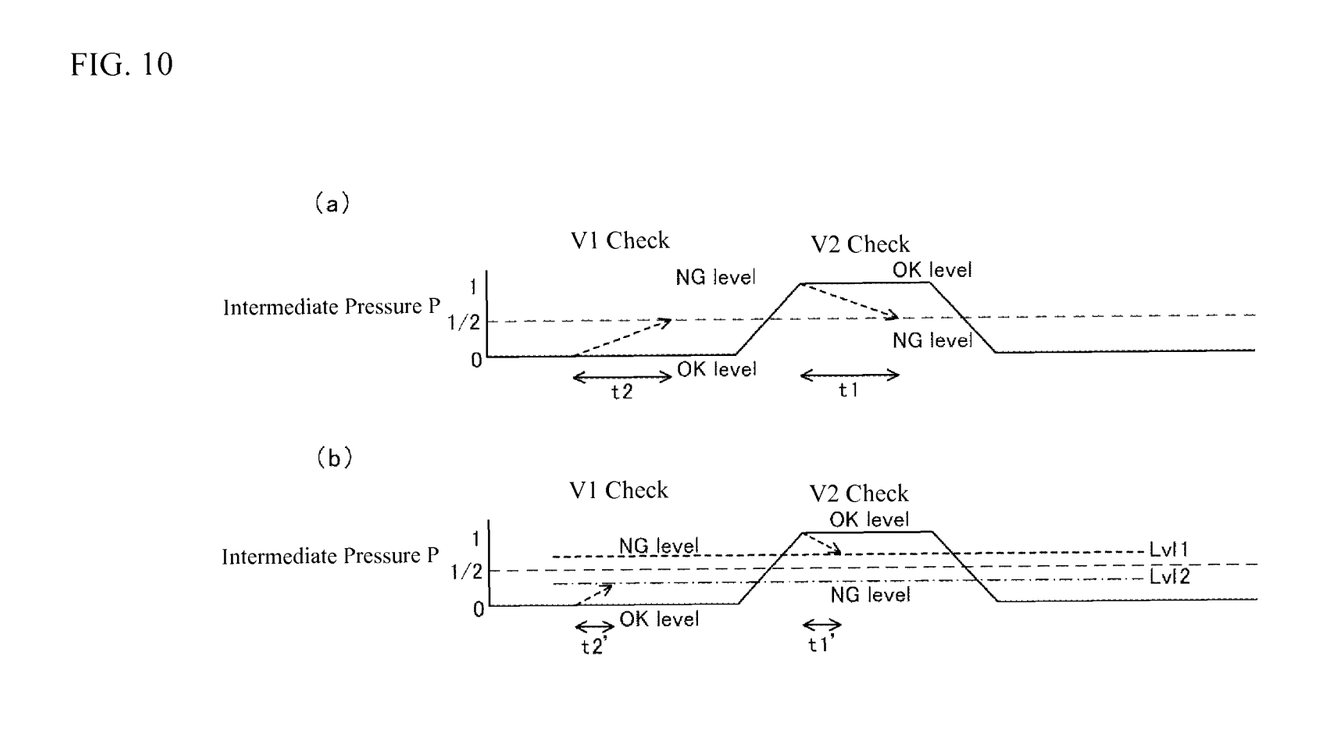
FIG. 10 is a timing chart showing the case wherein a plurality of threshold values is used in the valve leak detecting method according to the example according to the present invention.

Moreover, because, in the description above, the leak detection was performed for the valves 10 and 11, the case wherein a single threshold value (½ of the upstream pressure) was used for the intermediate pressure was illustrated. However, because the change in the intermediate pressure is gradual when there is a leak in a valve 10 or 11, the standby time intervals t1 and t2 are long, as shown in FIG. 10(*a*). Given this, different threshold values may be used for detecting respective leaks in the valves 10 and 11 (with a first threshold value greater than a second threshold value). In this case, either analog detection may be performed, or two pressure switches may be used, for the pressure detecting portion 12. Doing so enables the leak detection for the valve 10 to be evaluated as faulty if the intermediate pressure is equal to or greater than the second threshold value (Lvl2), and, for the leak detection for the valve 11, enables an evaluation of faulty if the intermediate pressure is less than the first threshold value (Lvl1), as illustrated in FIG. 10(*b*). The result is that the standby time can be shortened (t1'<t1 and t2'<t2), making it possible to shorten the processing time for the leak detection.

Note that the various forms of the example set forth above can be combined freely within the scope of the invention, or any given structural element within any of the forms of the example may be modified or any given structural element may be omitted in any of the forms of the example, within the scope of the present invention. For example, while in the example set forth above the burner controller 8 and the VPS controller 9 were structured as separate discrete devices, instead they may be structured so as to use a controller device wherein the functions of both the burner controller 8 and the VPS controller 9 are equipped in the device that is a single unit.

The invention claimed is:

1. A leak detecting method for valves supplying a fuel gas to a combustion equipment burner comprising:
 a first valve that is connected to a pipe of a fuel supplying system and controls a fluid flow rate within the pipe;
 a second valve that is connected in series to the pipe on the downstream side of the first valve and controls a fluid flow rate within the pipe;
 a third valve that is connected in series to the pipe on the downstream side of the second valve and controls a fluid flow rate within the pipe;
 a pressure detector detecting pressure within the pipe between the first and second valves; and
 a leak detector performing leak detection for the first and second valves, based on a pressure within the pipe, detected by the pressure detector, by controlling the first through third valves individually, wherein:
 the leak detector performs:
 a stopped pressure setting step setting the pressure within the pipe between the first and second valves to no less than a first threshold value or to less than a second threshold value by opening and closing the first through third valves individually when the combustion equipment stops combustion or after combustion is stopped;
 a startup pressure setting step for setting the pressure within the pipe between the first and second valves to no less than the first threshold value by opening and closing the first valve, in a state wherein the second and third valves are closed, when the combustion equipment is started;
 a first threshold value evaluating step for evaluating whether or not the pressure within the pipe, detected by the pressure detector after a first time interval has elapsed in a state wherein the first through third valves are closed, is at least the first threshold value, after the pressure within the pipe has been set to at least the first threshold value in the stopped pressure setting step or the startup pressure setting step;
 a second valve normalcy evaluating step evaluating the second valve as operating properly if the evaluation in the first threshold value evaluating step was that the pressure within the pipe is at least the first threshold value, and for evaluating that the second valve is faulty if the evaluation was that the pressure within the pipe is less than the first threshold value;
 a second threshold value evaluating step evaluating whether or not the pressure within the pipe, detected by the pressure detector after a second time interval has elapsed in a state wherein the first valve and the third valve are closed, is less than the second threshold value, after the pressure within the pipe has been set to less than the second threshold value in the stopped pressure setting step; and
 a first valve normalcy evaluating step evaluating the first valve as operating properly if the evaluation in the second threshold value evaluating step was that the pressure within the pipe is less than the second threshold value, and for evaluating that the first valve is faulty if the evaluation was that the pressure within the pipe is no less than the second threshold value.

2. The valve leak detecting method as set forth in claim 1, wherein:
 the first and second threshold value evaluating steps are performed when the combustion equipment has been started.

3. The valve leak detecting method as set forth in claim 1, wherein:
 the first and second threshold value evaluating steps are performed with the combustion equipment started.

4. The valve leak detecting method as set forth in claim 1, wherein:

in the stopped pressure setting step and the startup pressure setting step, the pressure within the pipe is caused to be near to the specific threshold value.

5. The valve leak detecting method as set forth in claim 1, wherein:
   in the stopped pressure setting step, the second threshold value is less than the first threshold value; and
   in the startup pressure setting step, the pressure within the pipe between the first and second valves is caused to be at least the first specific threshold value.

6. Combustion equipment comprising:
   a burner connected to a pipe of a fuel supplying system;
   a first valve connected to the pipe of the fuel supplying system and controls a fluid flow rate within the pipe;
   a second valve connected in series to the pipe on the downstream side of the first valve and controls a fluid flow rate within the pipe;
   a third valve connected in series to the pipe on the downstream side of the second valve and controls a fluid flow rate within the pipe;
   a pressure detector detecting pressure within the pipe between the first and second valves; and
   a leak detector performing leak detection for the first and second valves, based on a pressure within the pipe, detected by the pressure detector, by controlling the first through third valves individually, wherein:
   the leak detector comprises:
   a stopped pressure setting that sets the pressure within the pipe between the first and second valves to no less than a first threshold value or to less than a second threshold value by opening and closing the first through third valves individually when the combustion equipment stops combustion or after combustion is stopped;
   a startup pressure setting that sets the pressure within the pipe between the two valves to no less than the first threshold value by opening and closing the first valve, in a state wherein the second and third valves are closed, when the combustion equipment is started;
   a first threshold value evaluator evaluating whether or not the pressure within the pipe, detected by the pressure detector after a first time interval has elapsed with the first through third valves in a closed state, is at least the first threshold value, after the pressure within the pipe has been set to at least the first threshold value by the stopped pressure setting or the startup pressure setting;
   a second valve normalcy evaluator evaluating the second valve as operating properly if the evaluation by the first threshold value evaluator was that the pressure within the pipe is at least the first threshold value, and evaluates that the second valve is faulty if the evaluation was that the pressure within the pipe is less than the first threshold value;
   a second threshold value evaluator evaluating whether or not the pressure within the pipe, detected by the pressure detector after a second time interval has elapsed in a state wherein the first valve and the third valve are closed, is less than the second threshold value, after the pressure within the pipe has been set to less than the second threshold value by the stopped pressure setting; and
   a first valve normalcy evaluator evaluating the first valve as operating properly if the evaluation by the second threshold value evaluator was that the pressure within the pipe is less than the second threshold value, and evaluates that the first valve is faulty if the evaluation was that the pressure within the pipe is no less than the second threshold value.

7. The combustion equipment as set forth in claim 6, wherein:
   in the combustion equipment, the processing time for the valve leak detection is included in a pre-purge interval if the valve leak detection is performed when the combustion equipment is started up and the first and second valves have been evaluated as operating properly by the first and second valve normalcy evaluators.

8. The combustion equipment as set forth in claim 6, wherein:
   the combustion equipment comprises a valve controller controlling the first through third valves;
   the valve controller is disabled while the leak detector is operating; and
   the leak detector is disabled while the valve controller is operating.

* * * * *